United States Patent
Prabhu et al.

(10) Patent No.: US 12,165,337 B2
(45) Date of Patent: Dec. 10, 2024

(54) OBJECT DETECTION BASED ON PIXEL DIFFERENCES

(71) Applicant: Apple Inc., Cupertino, CA (US)

(72) Inventors: Anish Prabhu, Seattle, WA (US); Sayyed Karen Khatamifard, Seattle, WA (US); Hessam Bagherinezhad, Seattle, WA (US)

(73) Assignee: Apple Inc., Cupertino, CA (US)

( * ) Notice: Subject to any disclaimer, the term of this patent is extended or adjusted under 35 U.S.C. 154(b) by 660 days.

(21) Appl. No.: 17/068,750

(22) Filed: Oct. 12, 2020

(65) Prior Publication Data

US 2021/0133483 A1     May 6, 2021

Related U.S. Application Data

(60) Provisional application No. 62/929,706, filed on Nov. 1, 2019.

(51) Int. Cl.
    G06T 7/20           (2017.01)
    G06F 18/21        (2023.01)
                 (Continued)

(52) U.S. Cl.
    CPC ............ G06T 7/254 (2017.01); G06F 18/214 (2023.01); G06F 18/217 (2023.01); G06F 18/24 (2023.01);
                 (Continued)

(58) Field of Classification Search
    CPC ...... G06V 10/751; G06V 10/20; G06V 40/20; G06V 10/28; G06V 10/454; G06V 10/764;
                 (Continued)

(56) References Cited

U.S. PATENT DOCUMENTS 6,985,172 B1    1/2006   Rigney et al.
7,099,510 B2    8/2006   Jones et al.
                (Continued)

FOREIGN PATENT DOCUMENTS

CN          101847211 A      9/2010
CN          103679698 A      3/2014
              (Continued)

OTHER PUBLICATIONS

Bagherinezhad, et al., "Are Elephants Bigger than Butterflies? Reasoning about Sizes of Objects," Proceedings of the AAAI Conference on Artificial Intelligence, 2016, 30(1), retrieved from https://ojs.aaai.org/index.php/AAAI/article/view/10476.
(Continued)

*Primary Examiner* — Qian Yang
(74) *Attorney, Agent, or Firm* — BAKERHOSTETLER

(57) ABSTRACT

Aspects of the subject technology relate to machine learning based object recognition using pixel difference information. A difference image generated by subtraction of a current image from one or more previous images can be provided, as input, to a machine-learning engine. The machine-learning may output a detected object or a detected action based, at least in part, on the difference image. In this way, temporal information about the object can be provided to, and used by, a machine-learning model that is structured to accept image input.

22 Claims, 8 Drawing Sheets

(51) Int. Cl.
*G06F 18/214* (2023.01)
*G06F 18/24* (2023.01)
*G06F 18/25* (2023.01)
*G06N 5/04* (2023.01)
*G06N 20/00* (2019.01)
*G06T 7/254* (2017.01)
*G06T 7/73* (2017.01)
*G06V 10/28* (2022.01)
*G06V 10/44* (2022.01)
*G06V 10/764* (2022.01)
*G06V 10/778* (2022.01)
*G06V 10/82* (2022.01)
*G06V 20/52* (2022.01)
*G06V 40/20* (2022.01)

(52) U.S. Cl.
CPC ............ *G06F 18/251* (2023.01); *G06N 5/04* (2013.01); *G06N 20/00* (2019.01); *G06T 7/74* (2017.01); *G06V 10/28* (2022.01); *G06V 10/454* (2022.01); *G06V 10/764* (2022.01); *G06V 10/7788* (2022.01); *G06V 10/82* (2022.01); *G06V 20/52* (2022.01); *G06V 40/20* (2022.01); *G06T 2207/20081* (2013.01); *G06T 2207/20084* (2013.01); *G06T 2207/20224* (2013.01)

(58) Field of Classification Search
CPC .... G06V 10/7788; G06V 10/82; G06V 20/52; G06V 40/161; G06V 20/40; G06V 40/10; G06V 2201/08; G06K 9/6256; G06K 9/6262; G06K 9/6267; G06K 9/6289; G06N 5/04; G06N 20/00; G06N 3/08; G06N 3/0454; G06T 7/74; G06T 2207/20081; G06T 2207/20084; G06T 2207/20224; G06T 7/254
See application file for complete search history.

(56) References Cited

U.S. PATENT DOCUMENTS

| | | | |
|---|---|---|---|
| 9,064,172 B2 | 6/2015 | Jia et al. | |
| 9,424,493 B2 | 8/2016 | He et al. | |
| 2017/0270652 A1* | 9/2017 | Huang | G06T 7/001 |
| 2017/0286774 A1 | 10/2017 | Gaidon | |

FOREIGN PATENT DOCUMENTS

| | | |
|---|---|---|
| CN | 104346618 A | 2/2015 |
| CN | 108431826 A | 8/2018 |
| CN | 110151210 A | 8/2019 |
| EP | 3229206 | 10/2017 |

OTHER PUBLICATIONS

Lo et al., "Automatic congestion detection system for underground platforms," Proceedings of the 2001 International Symposium on Intelligent Multimedia, Video and Speech Processing, May 2001, pp. 158-161.

Ukrainski, "Automatic Change Detection in Multitemporal Remote Sensing Imaging Using Mathematical Operations," SCGIS, Remote Sensing, Sep. 2018, retrieved from http://www.50northspatial.org/change-detection-remote-sensing-math-operations-envi/, 8 pages.

Wang et al., "Improving pedestrian detection using motion-guided filtering," Pattern Recognition Letters, Nov. 2016, vol. 96, pp. 106-112.

International Search Report and Written Opinion from PCT/US2020/056363, dated Jan. 28, 2021, 18 pages.

Liu, et al., "Multi-Channel CNN-based Object Detection for Enhanced Situation Awareness," retrieved from https://arxiv.org/pdf/1712.00075.pdf, Nov. 2017, 9 pages.

European Office Action from European Patent Application No. 20803398.5, dated Mar. 9, 2023, 7 pages.

Duan et al., "Moving Object Detection Algorithm Using Improved ViBe Combined with Frame Difference," Journal of Chinese Computer Systems, 2019, vol. 40, No. 9 with English language abstract, pp. 1903-1908.

Chinese Office Action from Chinese Patent Application No. 202011182845.9, dated Apr. 7, 2024, 24 pages including English language summary.

* cited by examiner

OBJECT DETECTION BASED ON PIXEL DIFFERENCES

CROSS REFERENCE TO RELATED APPLICATIONS

This application claims the benefit of priority to U.S. Provisional Patent Application No. 62/929,706, entitled "Object Detection Based On Pixel Differences," filed on Nov. 1, 2019, the disclosure of which is hereby incorporated herein in its entirety.

TECHNICAL FIELD

This disclosure generally relates to object detection, and in particular relates to machine-learning based object detection.

BACKGROUND

Object detection is a computer technology related to computer vision and image processing that deals with detecting instances of semantic objects of a certain class (such as humans, buildings, or cars) in digital images and videos. Well-researched domains of object detection include face detection and pedestrian detection. Object detection has applications in many areas of computer vision, including image retrieval and video surveillance. Traditional methods for object detection first define features then use some machine-learning techniques such as support vector machine (SVM) to do the classification. More recent methods use deep learning techniques that are able to do end-to-end object detection without specifically defining features and are typically based on convolutional neural networks (CNN).

Machine learning (ML) is the study of algorithms and mathematical models that computer systems use to progressively improve their performance on a specific task. Machine learning algorithms build a mathematical model of sample data, known as "training data", in order to make predictions or decisions without being explicitly programmed to perform the task. Machine learning algorithms are used in the applications of email filtering, detection of network intruders, and computer vision, where it is infeasible to develop an algorithm of specific instructions for performing the task. Machine learning is closely related to computational statistics, which focuses on making predictions using computers. The study of mathematical optimization delivers methods, theory and application domains to the field of machine learning. Data mining is a field of study within machine learning and focuses on exploratory data analysis through unsupervised learning. In its application across business problems, machine learning is also referred to as predictive analytics.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
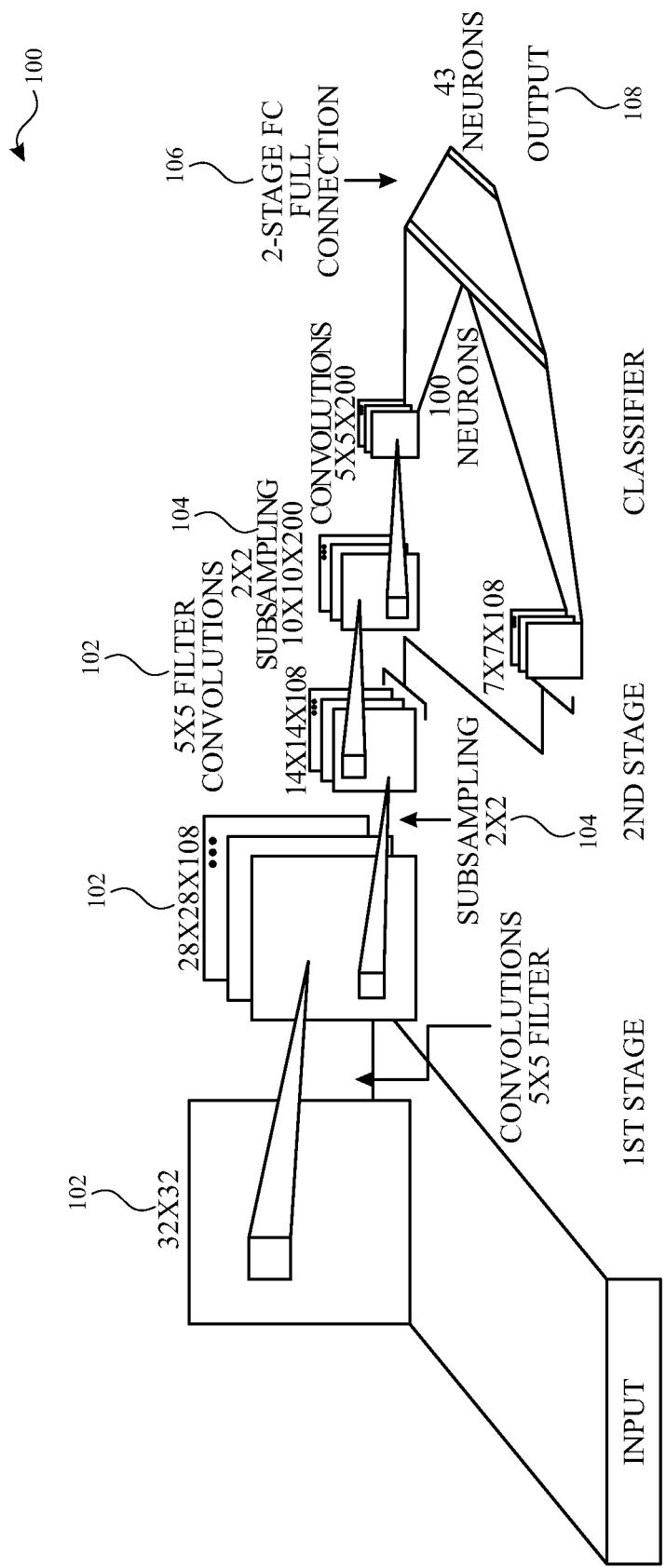
FIG. 1 illustrates an example architecture of a convolutional neural network (CNN) model.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

In particular embodiments, a computing system may leverage machine-learning models to improve the efficiency and effectiveness of multimedia data analysis. Multimedia data analysis may include the analysis of any suitable multimedia data such as text, image, video, audio, etc. Multimedia data analysis may be associated with particular applications such as object detection/recognition in images/videos, object tracking in images/videos, action detection in images/videos, event detection/recognition in images/videos, segmentation in images/videos, natural language processing, etc. In particular embodiments, the machine-learning models may be supervised, semi-supervised, or unsupervised. The machine-learning models may be based on regression learning, reinforcement learning, decision trees, random forest, support vector machines, neural networks, or any suitable learning algorithms. In particular embodiments, the computing system may use neural network-based machine-learning models for multimedia data analysis. As an example and not by way of limitation, the neural network-based models may include one or more of convolutional neural networks, long-short term memory units, or recurrent neural networks, or any combination thereof.

A neural network is a system of interconnected artificial "neurons" that exchange messages between each other. The connections have numeric weights that are tuned during the training process, so that a properly trained network will respond correctly when presented with an image or pattern to recognize. The network consists of multiple layers of feature-detecting "neurons". Each layer has many neurons that respond to different combinations of inputs from the previous layers. Training of a network is performed using a "labeled" dataset of inputs in a wide assortment of representative input patterns that are associated with their intended output response. Training uses iterative operations to iteratively determine the weights for intermediate and final feature neurons. In terms of a computational model, each neuron calculates the dot product of inputs and weights, adds the bias, and applies a non-linear trigger function (for example, using a sigmoid response function). Deep neural networks (DNN) have shown significant improvements in several application domains including computer vision and speech recognition. In computer vision, a particular type of DNN, known as a Convolutional Neural Network (CNN), can provide state-of-the-art results in image and video analysis.

A convolutional neural network (CNN) is a special case of the neural network described above. A CNN consists of one or more convolutional layers, often with a sub sampling layer, which are followed by one or more fully connected layers, as in a standard neural network. Convolutional neural networks (CNN) can be used for purposes of text/audio/image/video processing and can provide reliable results in different tasks that are useful in real world applications. Convolutional layers are useful for text/audio/image/video processing, as they extract features from these multimedia data relatively quickly and learn to extract the right features for the problem they are trained on (e.g., convolutional layers trained for classification may learn different filters (i.e., weights) than layers trained for regression, because different aspects or characteristics matter in each of those scenarios).

In accordance with aspects of the disclosure, one or more machine-learning models such as neural network-based machine-learning models may be trained to recognize and/or classify objects and/or actions based on pixel differences. The pixel differences may be difference values between the values of the pixels of a first image captured at a first time, and the values of spatially corresponding pixels in a second image captured at a second time. By providing the machine-learning model(s) with pixel difference information, temporal information that can be helpful in identifying objects and/or actions can be consumed by a machine-learning model without altering the structure of the model (e.g., the neural network) to separately receive image information and temporal information. In one or more implementations, the second image may be selected from and/or generated from multiple images captured at a time other than the first time. In one or more implementations, the first and second images themselves can be provided to a machine-learning model to allow the model to learn the relevance of the temporal information in classifying the objects and/or actions.

FIG. 1 illustrates an example architecture of a convolutional neural network (CNN) model 100. FIG. 1 shows one or more convolutional stages 102, sub-sampling 104, and fully connected stages 106 leading to the production of an output 108. As shown in FIG. 1, input data (such as a digitized representation of an image) is provided to one or more convolutional stages 102 (represented as "1st Stage" and "2nd Stage" in the figure). The output of each convolutional stage is provided as an input to the following stage; in some cases, further subsampling operations 104 may be carried out. A final subsampling stage acts as a classifier, with an output being passed to one or more fully connected stages 106 to produce an output 108.

In a CNN, convolution layers play the role of feature extractor, with the convolution filter kernel-weights being determined as part of the training process. Convolutional layers are able to extract the local features because they restrict the receptive fields of the hidden layers to be local. The weights of the convolutional layer used for feature extraction, as well as the fully connected layer used for classification, are determined during a training process.

By stacking multiple and different layers in a CNN, complex architectures may be built for different problems (e.g., classification). Four types of layers are most common: convolution layers, pooling/subsampling layers, non-linear layers, and fully connected layers. The convolution operation extracts different features of the input. The first convolution layer extracts low-level features such as edges, lines, and corners; higher-level layers extract higher-level features. The pooling/subsampling layer operates to reduce the resolution of the features and makes the features more robust against noise and distortion. There are at least two ways to perform pooling: max pooling and average pooling. Neural networks in general (and CNNs in particular) rely on a non-linear "trigger" function to signal distinct identification of likely features on each hidden layer.

CNNs may use a variety of specific functions, such as rectified linear units (ReLUs) and continuous trigger (non-linear) functions, to efficiently implement this non-linear triggering function. Fully connected layers are often used as the final layers of a CNN. These layers mathematically sum a weighting of the previous layer of features, indicating the precise mix of factors to determine a specific target output result. In case of a fully connected layer, all of the elements of all the features of the previous layer are used in the calculation of each element of each output feature. The final layers decode the network output and are determined by the task. As an example and not by way of limitation, for image classification, a set of probabilities is output using a classifier where the argmax is the most likely label for the input image. In object detection, class probabilities, bounding box coordinates, and their size(s) can be included in the output.

In particular embodiments, the computing system may use a compressed CNN model which may be suitable for a computing platform with low power and low memory. As an example and not by way of limitation, the computing platform may include a field-programmable gate array (FPGA). The compressed CNN model may be suitable for smaller devices such as cell/smart phones, tablet computing devices, embedded electronic devices, smart wearable devices in virtual reality and augmented reality, etc. In particular embodiments, the computing system may integrate fusion and quantization when training the compressed CNN model. In particular embodiments, the computing system may perform quantization for both the convolutional layers and the batch normalization layers of a CNN model.

For a convolutional layer, the computing system may quantize the floating-point input of this layer and the relevant weights/parameters to a low-bit (e.g., 8 bits or less) fixed-point number. For a batch normalization layer, the computing system may normalize input data based on specific means and variances which are tied to particular parameters and then similarly quantize the normalized data to a low-bit fixed-point number. In addition, the computing system may fuse the quantized convolution with a scaling factor associated with the batch normalization. The computing system may further quantize the fusion result to complete the compressed CNN model.

In particular embodiments, the computing system may use a binarized CNN model which may be computationally efficient for implementing convolutional operations. The computing system may perform one or more binary convolutions between a binarized input and binarized weights to generate the output corresponding to the particular task. In binary convolution, both weights and input activation space into binary (e.g., binary values such as +1 or −1). To accelerate training time and to improve training accuracy, batch normalization may normalize input batches to have zero mean and unit variance. During training time, several constants for multiplication and biases may be learned. Then, at inference time, these constants may be folded into a simpler algebraic expression resulting in a fused-multiply-and-add per input value.

In particular embodiments, the binarized CNN model may be based on binarization. Binarization may extract the sign of a real-valued input and pack it into a bitarray. For example, values greater than 0 can be represented as "0b1", else the values can be represented as "0b0". As an example and not by way of limitation, the input may include a plurality of values. Accordingly, binarizing the input may include extracting, for each of the plurality of values, a sign associated with the value, and packing, for each of the plurality of values, the extracted sign into a bitarray.

Figure 2:
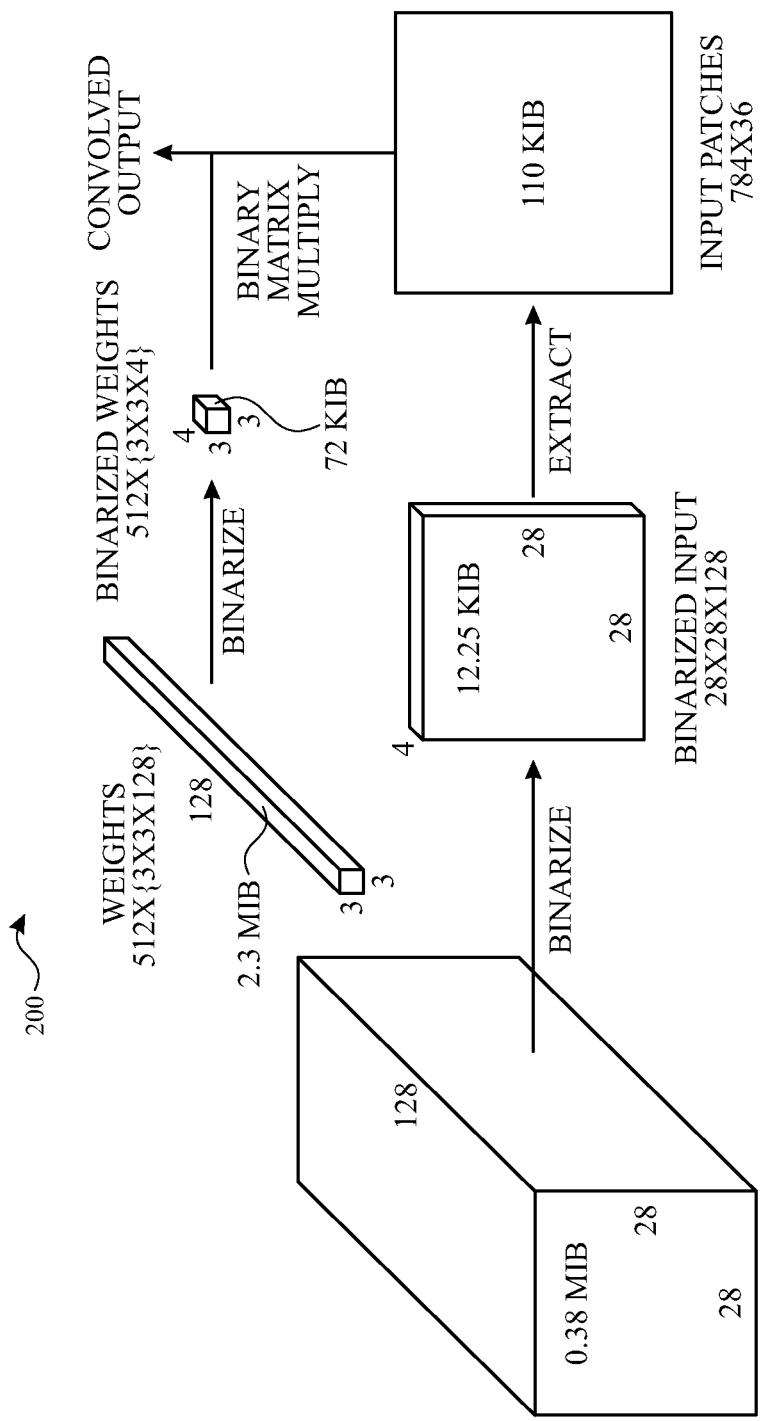
FIG. 2 illustrates an example visualization of a convolution layer in a binarized CNN model.

FIG. 2 illustrates an example visualization 200 of a convolution layer in a binarized CNN model. As an example and not by way of limitation, FIG. 2 shows that a convolution layer of size 28×28×128 with 512 output filters and a filter size of 3. As shown in FIG. 2, a Mebibyte (MiB) is a unit of measurement used in computer data storage. The prefix mebi comes from the binary system of data measurement that is based on powers of two. A Mebibyte equals $2^{20}$ or 1,048,576 bytes. Most of the memory savings may occur at the binarization step where the channel dimension in both input and weights are shrunk by a factor of 32. Binary convolution may use significantly less memory while improving performance. In this example, the data type size is 32 bits and all rectangular parallelepipeds are drawn in proportion to each other with an x:y:z ratio of 2:2:1.

In particular embodiments, the computing system may store a machine-learning model in a binary inference engine. The computing system may further combine both the binary inference engine and its associated model data in a single module, such that the entire engine/model are self-contained in a single module. In particular embodiments, the single module may be stored as a particular file including one or more of a dynamic link library (dll) file or an extended binary (xb) file. A dll/xb file may be used for holding multiple codes and procedures. As an example and not by way of limitation, a user may use an application running on a client device or a computer attached to a video camera and speaker. The application may dynamically link to an xb file. In one example, a user may use an application to classify a scene with humans in it. For example, an application may be associated with a file including code and/or procedures for detecting people, such as a filed named "people detector.xb", that can be dynamically loaded at runtime. In one example, the application may output a wave file through the speaker that says "person", if a person is detected in one or more images input to the application.

The user may further use the application to classify the emotional state of the detected person. Without recompiling the application, the computing system may swap out the "people detector.xb" file with a file including code and/or procedures for detecting an emotion, such as a file named "emotion detector.xb" on a disk. In this example, the user may re-launch the application, and the speaker may say "happy" or "sad" responsive to detecting a happy emotion or a sad emotion in one or more images. In particular embodiments, the computing system may combine the binary inference engine and the model data using a linker. As a result, at runtime the computing system may have the capability to self-extract (e.g., to memory or temporary storage) the appropriate model (e.g., parameters, etc.). The computing system may further construct a machine-learning architecture based on declarative data in the memory or in the data portion of the particular file (e.g., xb file). In particular embodiments, a single particular file may have multiple binary inference engines. Accordingly, the computing system may enumerate multiple binary inference engines via one or more application programming interfaces (APIs). In particular embodiments, the computing system may assist users to solve a plurality of tasks efficiently and effectively by integrating machine-learning models and their relevant model data.

In particular embodiments, a computing system may train object and/or action detection models by incorporating temporal information associated with images/videos captured by static cameras. The resulting object detection models may have improved performance over conventional object detection models. In particular embodiments, the computing system may approximate the foreground of an image/video frame and pass the foreground into the models as extra input. The computing system may also approximate the background of the image/video frame to subtract it from the current image/video frame to retrieve the foreground mask (e.g., including image data for objects of interest). As an example and not by way of limitation, the subtraction may be based on a pixel difference between the current image/video frame and previous image/video frame.

A pixel difference may be a difference value resulting from a subtraction of a pixel value of a pixel of a first image of a scene captured at a first time, from a corresponding pixel value of a corresponding pixel of a second image of the scene captured at a second time. In one or more implementations, pixel differences for entire images can be obtained by subtracting the second image from the first image, or vice versa.

In particular embodiments, a stream of images or a video may be associated with temporal information. Each image/video frame may be, for example, a standard RGB image. With pixel subtraction between a current image/video frame and a previous image/video frame, the computing system may identify a movement of an object based on such difference. In particular embodiments, pixel subtraction may be a basis for background subtraction from the foreground. The computing system may approximate the background for the stream of images or the video. In particular embodiments, the computing system may take an average of a number of images/video frames (e.g., 100) before the current image/video frame as an estimation of the background. The computing system further subtract the estimation from the current image/video frame and provide the subtraction result into a training process and/or an inference process of the object detection model.

In particular embodiments, the computing system may use different techniques to train a number of object detection models. The computing system may apply the trained object detection models to images/videos captured by, for example, static (e.g., stationary or fixed) cameras. The results of applying the trained object detection model to the images/ videos from the static cameras may be used to test the efficacy of the static cameras for object detection. As an example and not by way of limitation, the embodiments disclosed herein have used a dataset collected by particular static cameras as experiments to test different object detection models disclosed herein. The dataset may include a plurality of video clips. Each video clip may be, for example, 12 seconds long. Each video clip may include a plurality of frames that are sampled at, for example, one frame per second (fps).

In one or more embodiments, the computing system may train an object detection model as follows. The computing system may first approximate the foreground or motion in a stream of images/video frames by taking a pixel subtraction between the current image/video frame and the previous image/video frame and taking the absolute value of the resulting quantity. Denoting $t_i$ as a pixel in the current image/video frame and $t_{i-1}$ as a pixel in the previous image/video frame, the computation of the foreground calculation may be formulated as $|t_i-t_{i-1}|$ where $||$ is an operation of calculating the absolute value. The computing system may perform the above computation between some or all the pixels of the current image/video frame and those (e.g., corresponding pixels) of the previous image/video frame.

Figure 3:
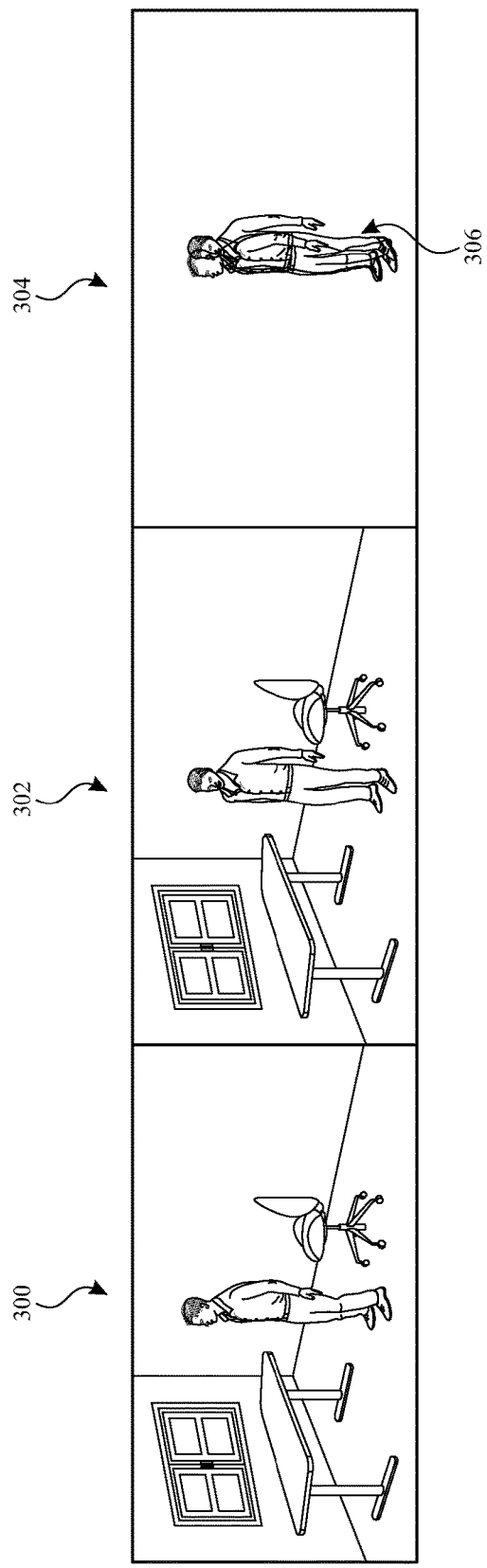
FIG. 3 illustrates an example comparison between a current image, a previous image, and an image generated based on pixel differences between the current image and previous image.

FIG. 3 illustrates an example comparison between a current image 300 (e.g., a first image of a scene captured at a first time), a previous image 302 (e.g., a second image of the scene captured at a second time), and an image 304 (e.g., a difference image) generated based on pixel differences between the current image 300 and previous image 302. As can be seen, a person 306 may be identified as a foreground object based on pixel subtraction between the current image 300 and the previous image 302.

Figure 4:
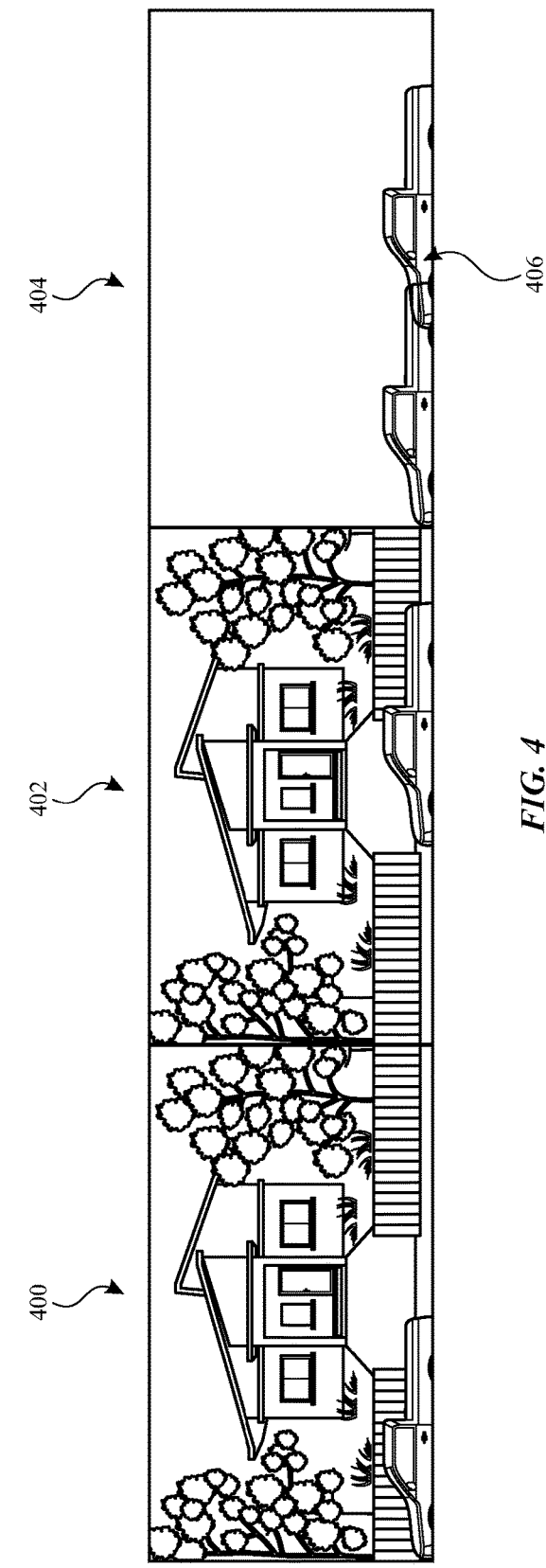
FIG. 4 illustrates another example comparison between a current image, a previous image, and an image generated based on pixel differences between the current image and previous image.

FIG. 4 illustrates another example comparison between a current image 400, a previous image 402, and an image 404 (e.g., a difference image) generated based on pixel differences between the current image 400 and previous image 402. As can be seen, a truck 406 may be identified as a foreground object based on pixel subtraction between the current image 400 and the previous image 402. An image or a video frame may have one or more channels corresponding to primary colors. For example, an image or a video frame may have a red channel, a green channel and a blue channel, i.e., RGB image. In particular embodiments, the computing system may compute the pixel subtraction for every channel of the image/video frame. The subtraction result from each channel may be then concatenated as three extra channels (e.g., for RGB images/video frames).

In particular embodiments, the computing system may train the object detection model based on neural networks by using ImageNet (i.e., a public dataset) or any other set of training images. For such training, the computing system may first perform image pre-processing such as mean and variance normalization on the training images/video frames. After pre-processing, the aforementioned pixel subtraction and concatenation over all three channels may be performed. The number of input channels for the neural networks may be doubled from, for example, 3 to 6. The accuracy of experimental results can be quantified with, for example, a mean Average Precision (mAP), to measure performance of various object detection models. For example, the mAP for an object detection model described herein can be used to compare the performance of the object detection model with, for example, a baseline performance of a conventional object detection model without difference information. In one or more examples, the comparison can be performed using mAP@N, where the number N after the "@" reflects the minimum Intersection over Union (IoU) of a candidate bounding box with the ground truth to be considered a successful match. The experimental results (e.g., in an example use case of person and/or vehicle detection as illustrated in FIGS. 3 and 4) show that this object detection model (e.g., a model trained to detect objects based on inputs that include three difference channels concatenated with three image channels, the difference channels based on a pixel subtraction between a current image and a previous image) has an mAP@0.5 that is approximately 30 percent higher than the baseline using a conventional object detection model without difference information.

In one or more embodiments, the computing system may train another object detection model as follows. The computing system may first approximate the foreground or motion in a stream of images/video frames by taking a raw pixel subtraction between the current image/video frame and the previous image/video frame instead of the absolute value of the pixel difference. Denoting $t_i$ as a pixel in the current image/video frame and $t_{i-1}$ as a pixel in the previous image/video frame, the computation of the foreground calculation may be formulated as $t_i-t_{i-1}$. The computing system may perform the above computation between some or all the pixels of the current image/video frame and those (e.g., corresponding pixels) of the previous image/video frame. By doing so, the computing system may obtain extra information since the raw pixel difference also includes the sign. The extra information may improve the training of the object detection model. Similarly, the computing system may compute the raw pixel subtraction for every channel of the image/video frame. The subtraction result from each channel may be then concatenated as three extra channels (e.g., for RGB images/video frames).

The computing system may further train the object detection model based on neural networks by using ImageNet (i.e., a public dataset) and/or any other set of training images. For such training, the computing system may first perform image pre-processing such as mean and variance normalization on the training images/video frames. After pre-processing, the aforementioned pixel subtraction and concatenation over all three channels may be performed. The experimental results show that this object detection model has an mAP@0.5 that is approximately 32 percent higher than the baseline.

In one embodiment, the computing system may train another object detection model as follows. The computing system may concatenate the previous image/video frame with the current image/video frame without taking the pixel differences between them. By doing so, the computing system may avoid enforcing human prior knowledge that training the object detection model requires extra channels which are based on the pixel differences and that the extra channels are useful information. Instead, the training process may be able to learn to calculate pixel difference if it is indeed useful. In particular embodiments, the computing system may further train the object detection model based on neural networks by using ImageNet (i.e., a public dataset) or any other set of training images. For such training, the computing system may first perform mean and variance normalization on the training images/video frames. After that, the aforementioned concatenation between the previous image/video frame and current image/video frame is performed. The experimental results show that this object detection model has an mAP@0.5 that is approximately 26 percent higher than the baseline using a conventional object detection model without temporal information.

In one or more embodiments, the computing system may train another object detection model as follows. The computing system may apply noise reduction techniques when training the object detection model. Such techniques may be useful when the stream of images or videos contain objects (e.g., objects in addition to objects for which detection is desired) that showed minor movements from image/frame to image/frame. As an example and not by way of limitation, the movement of trees blowing in the wind may cause noise to be introduced into the pixel subtraction. The computing system may first approximate the foreground or motion in a stream of images/video frames by taking a raw or absolute value pixel subtraction between the current image/video frame and the previous image/video frame. Denoting $t_i$ as a pixel in the current image/video frame and $t_{i-1}$ as a pixel in the previous image/video frame, the computation of the foreground calculation may be formulated as $t_i - t_{i-1}$, or the absolute value thereof.

The computing system may perform the above computation between some or all the pixels of the current image/video frame and those (e.g., corresponding pixels) of the previous image/video frame. The computing system may then add a low-pass filter to the subtraction result between the previous image/video frame and the current image/video frame (e.g., based on all pixels) to reduce the noises caused by the subtraction. As an example and not by way of limitation, the low-pass filter may be a simple Gaussian blur. The Gaussian blur may be 3×3 Gaussian blur on top with a sigma value of 2. The computing system may further train the object detection model based on neural networks by using ImageNet (i.e., a public dataset) or any other set of training images. For such training, the computing system may first perform image pre-processing such as mean and variance normalization on the training images/video frames. After pre-processing, the aforementioned pixel subtraction and noise reduction (e.g., Gaussian blur) may be performed, which results in the input of the neural networks. The experimental results show that this object detection model has an mAP@0.5 that is approximately 32 percent higher than the baseline using a conventional object detection model without difference information.

In one or more embodiments, the computing system may train another object detection model as follows. In some scenarios, pure pixel subtraction may not model the actual background of an image or a video frame accurately, which may result in "ghost images" instead of just providing foreground information. "Ghost images" are those images in which objects were in the previous image/video frame but not in the current one. Pure pixel subtraction may provide some signal about where objects were in the previous frame but may also confuse the object detection model during training.

The computing system may (e.g., to address the ghost image issue) average two, three, or more than three (e.g., many) previous images/video frames, which may provide a better approximation of the background, for subtraction from the current image/video. This may be because for any given pixel, most of the time the content in that pixel may be the background, so by taking the average of several of the previous images/video frames, the computing system may approximate the pixel as close to the true (e.g., background) value as possible over time. In particular embodiments, the computing system may first calculate the mean for a number of previous images/videos frames as an approximation of the background. As an example and not by way of limitation, the computing system may average the previous 3, 5, or 7 images/video frames. The computing system may then take a raw (or absolute value) pixel subtraction between the current image/video frame and the approximated background (e.g., the averaged 3, 5, or 7 previous images/frames). Denoting $t_i$ as a pixel in the current image/video frame and $t_{i-1}$ as a pixel in the approximated (e.g., average) background, the computation of the foreground calculation may be formulated as $t_i - t_{i-1}$, or the absolute value thereof.

The computing system may perform the above computation between some or all the pixels of the current image/video frame and those (e.g., corresponding pixels) of the approximated background. Similarly, the computing system may compute the raw pixel subtraction for every channel of the image/video frame. The subtraction result from each channel may be then concatenated as three extra channels (e.g., for RGB images/video frames). The computing system may further train the object detection model based on neural networks by using ImageNet (i.e., a public dataset) or any other set of training images. For such training, the computing system may first perform pre-processing operations such as mean and variance normalization on the training images/video frames. After pre-processing, the aforementioned pixel subtraction and concatenation over all three channels are performed. The experimental results show that this object detection model has an mAP@0.5 that is approximately 31.5 percent higher than the baseline when the background is approximated by averaging previous 3 images/video frames, an mAP@0.5 that is approximately 32 percent higher than the baseline when the background is approximated by averaging previous 5 images/video frames, and an mAP@0.5 that is approximately 29 percent higher than the baseline when the background is approximated by averaging previous 7 images/video frames.

In one or more embodiments, the computing system may train another object detection model as follows. As aforementioned, pure pixel subtraction may not model the actual background of an image or a video frame accurately. In one or more implementations, the computing system may take the median among one, two, three, or more than three (e.g., many) previous images/video frames as an approximation of the background. The reason for using the median is that the median is a statistic that is more robust to outliers, so the median of several previous images may better approximate the background than the mean of several previous images in some scenarios. As an example and not by way of limitation, the computing system may take the median among previous 3, 5, or 7 images/video frames. The computing system may then take a raw (or absolute value) pixel subtraction between the current image/video frame and the approximated background resulting from the median of the previous images/frames. Denoting $t_i$ as a pixel in the current image/video frame and $t_{i-1}$ as a pixel in the approximated (e.g., median) background generated from the median of the previous images/frames, the computation of the foreground calculation may be formulated as $t_i - t_{i-1}$, or the absolute value thereof.

The computing system may perform the above computation between some or all the pixels of the current image/video frame and those (e.g., corresponding pixels) of the approximated background. Similarly, the computing system may compute the raw (or absolute value) pixel subtraction for every channel of the image/video frame. The subtraction result from each channel may be then concatenated as three extra channels (e.g., for RGB images/video frames). The computing system may further train the object detection model based on neural networks by using ImageNet (i.e., a public dataset) or any other set of training images. For such training, the computing system may first perform image pre-processing operations such as mean and variance normalization on the training images/video frames. After pre-processing, the aforementioned pixel subtraction and concatenation over all three channels may be performed. In particular embodiments, the computing system may apply heuristic running approximations as a way of implementing such median background estimation during inference. The experimental results show that this object detection model has an mAP@0.5 that is approximately 30 percent higher than the baseline when the background is approximated by taking the median of previous 3 images/video frames, an mAP@0.5 that is approximately 33 percent higher than the baseline when the background is approximated by taking the median of previous 5 images/video frames, and an mAP@0.5 that is approximately 28 percent higher than the baseline when the background is approximated by taking the median of previous 7 images/video frames.

Figure 5:
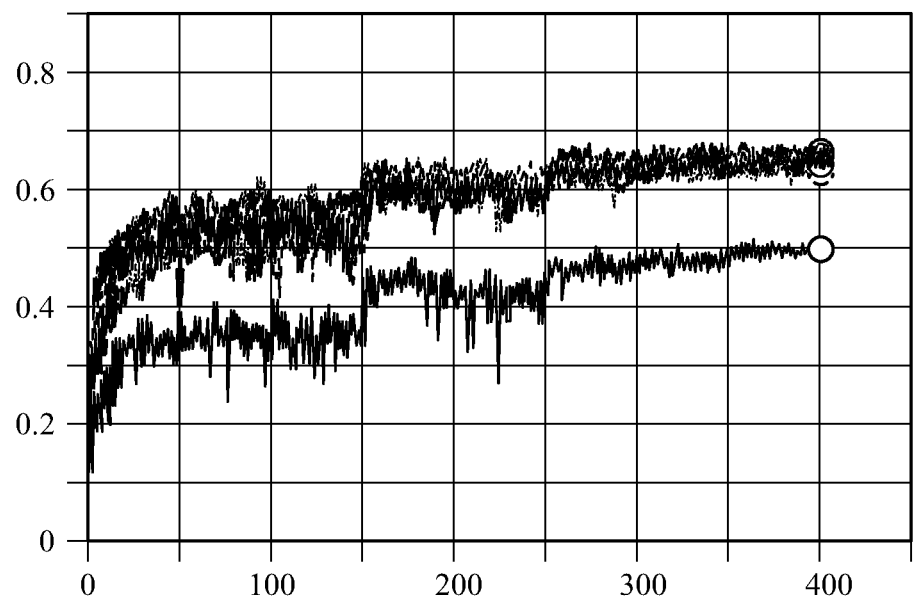
FIG. 5 illustrates example experimental results.

FIG. 5 illustrates example experimental results. In FIG. 5, the top curve corresponds to the results obtained by the object detection model when the background is approximated by taking the median of previous 5 images/video frames. The second top curve corresponds to the results obtained by the object detection model when the background is approximated by taking the median of previous 3 images/video frames. The bottom curve corresponds to the results obtained by the baseline model.

In one or more embodiments, the computing system may train another object detection model as follows. The computing system may use data augmentation to vary which image/video frame to use for the pixel difference calculation instead of using the image/video frame immediately before the current image/video frame. This approach may be reasonable to use when the sampling rate for a training data set is limited to a particular value, e.g., 1 fps, because actual speeds at which people/objects move may vary (e.g., relative to the fixed sampling rate). In particular embodiments, using data augmentation may be based on a particular parameter. An example parameter for data augmentation may be denoted as a "skip window". This parameter may be considered as a window from which to consider sampling. As an example and not by way of limitation, if "skip window"=n, the computing system may consider a window of n images/video frames. For example, n may be 3 or 4.

The computing system may sample the current image/video frame, which leaves n−1 images/video frames remaining for consideration for subtraction from the current image/video frame. The computing system may (e.g., randomly) sample a previous image/video frame for pixel subtraction from those n−1 remaining images/video frames, such as with uniform probability. As a result, the amount of time passing between the current and previous frame used for subtraction may be varied. In particular embodiments, a labeled previous image/video frame may be not required since the computing system only computes the loss on the current image/video frame. As a result, the embodiments disclosed herein may have a technical advantage of increased sampling rate for more data for a (e.g., publicly available) training dataset even if such dataset has a constrained sampling rate, e.g., 1 fps. As an example and not by way of limitation, the computing system may first determine a window size (e.g., 3 or 4).

The computing system may then sample the current image/video frame. The computing system may then take 3 or 4 previous images/video frames as a candidate pool. The computing system may then randomly select one image/video frame from these 3 or 4 candidate pool images/video frames with uniform probability. The computing system may then take a raw (or absolute value) pixel subtraction between the current image/video frame and the selected image/video frame. The computing system may perform the above computation between some or all the pixels of the current image/video frame and those (e.g., corresponding pixels) of the selected image/video frame. Similarly, the computing system may compute the raw (or absolute value) pixel subtraction for every channel of the image/video frame. The subtraction result from each channel may be then concatenated as three extra channels (e.g., for RGB images/video frames).

The computing system may further train the object detection model based on neural networks by using ImageNet (i.e., a public dataset) or any other set of training images. For such training, the computing system may first perform image pre-processing such as mean and variance normalization on the training images/video frames. After pre-processing, the aforementioned pixel subtraction and concatenation over all three channels are performed. During the inference time, the computing system may randomly sample an image or a video frame within the sample window. In alternative embodiments, the computing system may use a more sophisticated approach for sampling the image/video frame during the inference time. As an example and not by way of limitation, the computing system may average over different delays from the current image/video frame to sample the previous image/video frame. The experimental results show that this object detection model has an mAP@0.5 that is approximately 31.5 percent higher than the baseline when the window size is 3 and an mAP@0.5 that is approximately 29 percent higher than the baseline when the window size is 4.

In particular embodiments, the computing system may use different types of neural networks to train the object detection models on top of using the pixel difference for the different embodiments mentioned above. As an example and not by way of limitation, the computing system may incorporate the absolute/raw pixel difference into a two-stream convolutional network. A two-stream neural network takes both temporal and spatial input. The intuition for the two-stream neural network is that the model may utilize different filters to represent features from motion rather than features to derive context from static images. For example, the temporal input may include optical flow and the spatial input may include RGB images. Accordingly, there are two pathways in the network for the separate inputs, e.g., RGB image and optical flow, and often lateral connections to share information between the paths. In particular embodiments, the computing system may apply a separate path for the absolute/raw pixel difference disclosed herein as opposed to raw RGB images when using the two-stream convolutional network. As another example and not by way of limitation, the computing system may incorporate the absolute/raw pixel difference into a deep convolutional neural network integrating regional proposals and feature extraction.

As another example and not by way of limitation, the computing system may incorporate the absolute/raw pixel difference into a region proposal network (R-CNN). R-CNN uses selective search to determine region proposals, pushes these through a classification network, and then uses a support vector machine (SVM) to classify the different regions. As yet another example and not by way of limitation, the computing system may incorporate the absolute/raw pixel difference into a recurrent neural network (RNN). RNN is a class of artificial neural networks where connections between nodes form a directed graph along a temporal sequence. This allows the network to exhibit temporal dynamic behavior.

Figure 6:
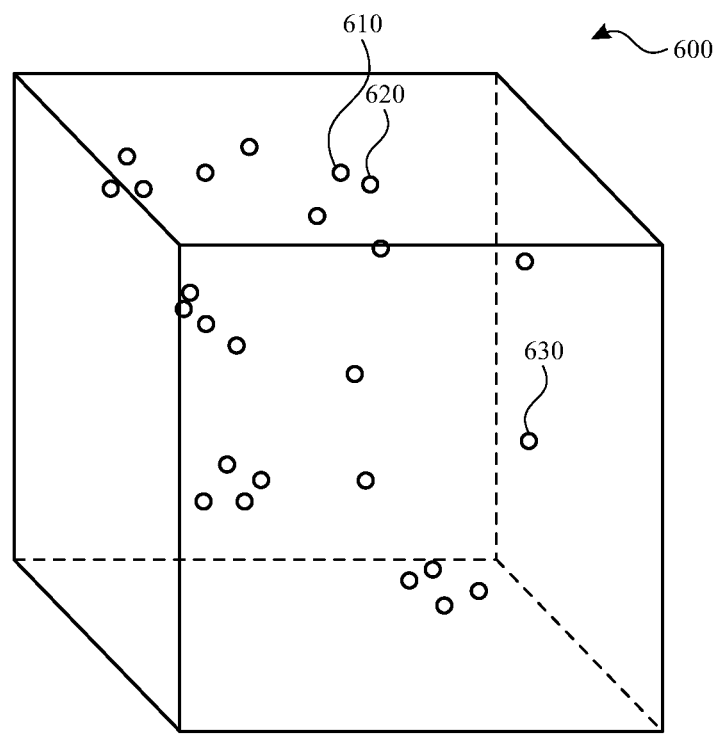
FIG. 6 illustrates an example view of an embedding space.

FIG. 6 illustrates an example view of a vector space 600. In particular embodiments, an object or an n-gram may be represented in a d-dimensional vector space, where d denotes any suitable number of dimensions. Although the vector space 600 is illustrated as a three-dimensional space, this is for illustrative purposes only, as the vector space 600 may be of any suitable dimension. In particular embodiments, an n-gram may be represented in the vector space 600 as a vector referred to as a term embedding. Each vector may include coordinates corresponding to a particular point in the vector space 600 (i.e., the terminal point of the vector). As an example and not by way of limitation, vectors 610, 620, and 630 may be represented as points in the vector space 600, as illustrated in FIG. 6. An n-gram may be mapped to a respective vector representation. As an example and not by way of limitation, n-grams $t_1$ and $t_2$ may be mapped to vectors $\vec{v}_1$ and $\vec{v}_2$ and in the vector space 600, respectively, by applying a function $\vec{\pi}$ defined by a dictionary, such that $\vec{v}_1 = \vec{\pi}(t_1)$ and $\vec{v}_2 = \vec{\pi}(t_2)$.

As another example and not by way of limitation, a dictionary trained to map text to a vector representation may be utilized, or such a dictionary may be itself generated via training. As another example and not by way of limitation, a word-embeddings model may be used to map an n-gram to a vector representation in the vector space 600. In particular embodiments, an n-gram may be mapped to a vector representation in the vector space 600 by using a machine leaning model (e.g., a neural network). The machine-learning model may have been trained using a sequence of training data (e.g., a corpus of objects each comprising n-grams).

In particular embodiments, an object may be represented in the vector space 600 as a vector referred to as a feature vector or an object embedding. As an example and not by way of limitation, objects $e_1$ and $e_2$ may be mapped to vectors $\vec{v}_1$ and $\vec{v}_2$ in the vector space 600, respectively, by applying a function $\vec{\pi}$ such that $\vec{v}_1 = \vec{\pi}(e_1)$ and $\vec{v}_2 = \vec{\pi}(e_2)$.

In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object including a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object including audio data may be mapped to a vector based on features such as a spectral slope, a tonality coefficient, an audio spectrum centroid, an audio spectrum envelope, a Mel-frequency cepstrum, or any other suitable information.

In particular embodiments, when an object has data that is either too large to be efficiently processed or includes redundant data, a function may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the computing system may calculate a similarity metric of vectors in vector space 600. A similarity metric may be a cosine similarity, a Minkowski distance, a Mahalanobis distance, a Jaccard similarity coefficient, or any suitable similarity metric. As an example and not by way of limitation, a similarity metric of $\vec{v}_1$ and $\vec{v}_2$ and may be a cosine similarity $$\frac{\vec{v_1}\cdot\vec{v_2}}{\|\vec{v_1}\|\,\|\vec{v_2}\|}.$$

As another example and not by way of limitation, a similarity metric of $\vec{v}_1$ and $\vec{v}_2$ may be a Euclidean distance $\|\vec{v}_1 - \vec{v}_2\|$. A similarity metric of two vectors may represent how similar the two objects or n-grams corresponding to the two vectors, respectively, are to one another, as measured by the distance between the two vectors in the vector space 600. As an example and not by way of limitation, vector 610 and vector 620 may correspond to objects that are more similar to one another than the objects corresponding to vector 610 and vector 630, based on the distance between the respective vectors. Although this disclosure describes calculating a similarity metric between vectors in a particular manner, this disclosure contemplates calculating a similarity metric between vectors in any suitable manner.

Figure 7:
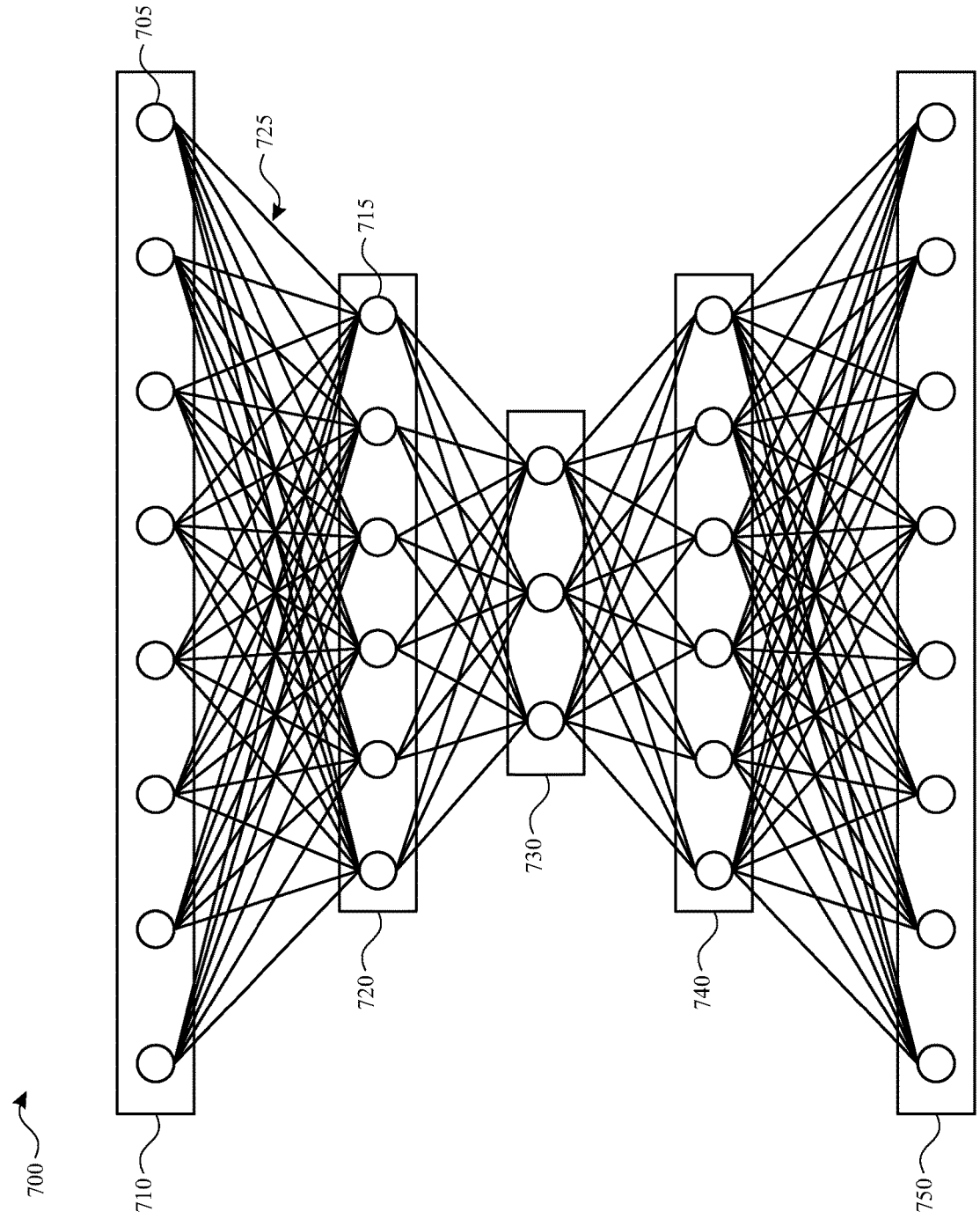
FIG. 7 illustrates an example artificial neural network.

FIG. 7 illustrates an example artificial neural network ("ANN") 700. In particular embodiments, an ANN may refer to a computational model comprising one or more nodes. Example ANN 700 may include an input layer 710, hidden layers 720, 730, 740, and an output layer 750. Each layer of the ANN 700 may include one or more nodes, such as a node 705 or a node 715. In particular embodiments, each node of an ANN may be connected to another node of the ANN. As an example and not by way of limitation, each node of the input layer 710 may be connected to one of more nodes of the hidden layer 720. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 7 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 7 depicts a connection between each node of the input layer 710 and each node of the hidden layer 720, one or more nodes of the input layer 710 may not be connected to one or more nodes of the hidden layer 720.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 720 may include the output of one or more nodes of the input layer 710. As another example and not by way of limitation, the input to each node of the output layer 750 may include the output of one or more nodes of the hidden layer 740. In particular embodiments, an ANN may be a deep neural network (e.g., a neural network comprising at least two hidden layers). In particular embodiments, an ANN may be a deep residual network. A deep residual network may be a feedforward ANN including hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may include a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs.

In particular embodiments, each connection between nodes may be associated with a weight. As an example and not by way of limitation, a connection 725 between the node 705 and the node 715 may have a weighting coefficient of 0.4, which may indicate that 0.4 multiplied by the output of the node 705 is used as an input to the node 715. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, and $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may include inputs to the ANN 700 and an expected output. As another example and not by way of limitation, training data may include vectors each representing a training object and an expected label for each training object. In particular embodiments, training an ANN may include modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distance between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Figure 8:
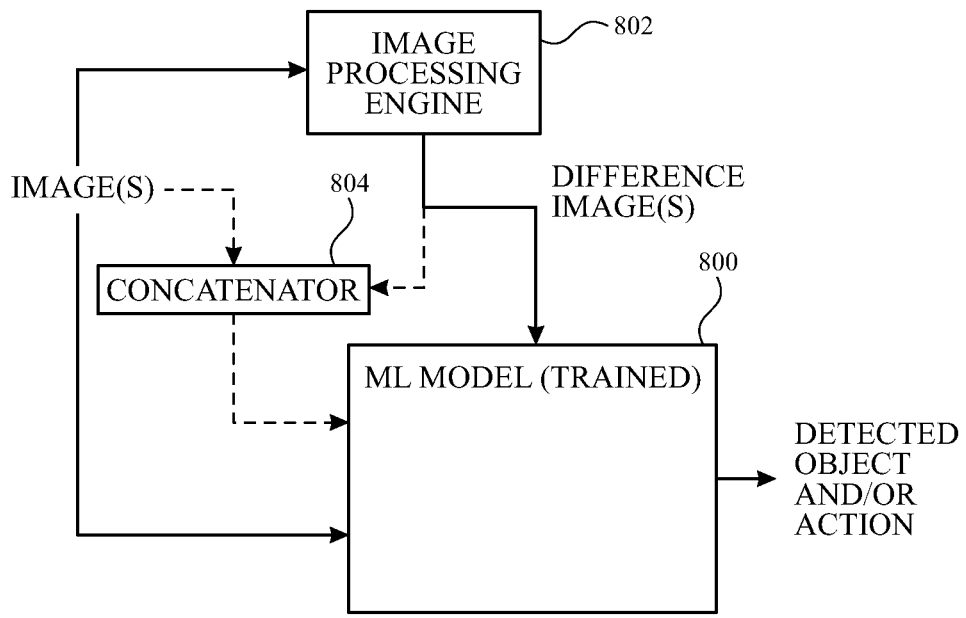
FIG. 8 illustrates a schematic diagram of an example process for object detection based on pixel differences using a machine-learning engine in accordance with aspects of the subject technology.

FIG. 8 is a schematic diagram illustrating execution of a trained machine-learning model for object detection in accordance with aspects of the subject disclosure. In various implementations, an electronic device or other processing or computing system (such as the computing system 1200 of FIG. 12) may include a trained machine-learning (ML) model as described herein, such as trained machine-learning model 800. As illustrated in FIG. 8, one or more images (e.g., a first image and a second image captured at corresponding first and times, and/or a series of image frames or video frames) may be provided, as input, to the trained ML model 800. The trained ML model 800 may output, responsive to receiving the image input, a detected object and/or a detected action. In various implementations, the trained ML model 800 may be trained to output whether an object or an action was detected, or to a classification of a detected object or a detected action. Examples of objects that can be detected and/or classified by the trained ML model 800 include a person, a face, an expression, a vehicle, or other animate or inanimate object. Examples of actions that can be detected and/or classified by the trained ML model 800 include user gestures such as hand gestures, changes to facial expressions, a person entering a crosswalk or a building or crossing a threshold, a vehicle travelling in a straight line, accelerating, decelerating, or making a turn.

As shown, one or more images may be provided directly to the trained ML model 800, or the images may be processed prior to providing the images and/or other image data to the trained ML model 800. For example, one or more images may be provided to an image processing engine 802. Image processing engine may be implemented in hardware or software, and may be implemented at the same device or system as the trained ML model, or may be implemented separately from the trained ML model 800 (e.g., at a different device or system).

Image processing engine 802 may perform image pre-processing operations such as mean and/or variance normalization operations on the received images. Image processing engine 802 may perform other image processing operations such as pixel subtraction operations (e.g., subtracting pixels of a first image from corresponding pixels of a second image, or vice versa, such as by subtracting the first image from the second image, or vice versa). The pixel subtraction operations may generate a raw pixel subtraction and/or an absolute value of the raw pixel subtraction. The image processing operations may also include combining multiple images such as by averaging or computing a median of the multiple images (e.g., prior to performing subtraction operations). The image processing operations may include data augmentation operations, such as (e.g., random) selection of a previous image frame for subtraction from a current image frame, from a sampling pool of previous frames within a window. The image processing operations may include noise reduction operations, such as low pass filtering (e.g., Gaussian blurring) of a difference image. In one or more implementations, processed images and/or difference images (e.g., images containing pixel values that each correspond to a difference between pixels of two images) may be output from the image processing engine to the trained ML model 800. The trained ML model 800 may generate the output detected object and/or action responsive to receiving the difference image(s) and/or the images.

As shown in FIG. 8, a concatenator 804 may also be provided. The concatenator 804 may concatenate images and/or concatenate difference image(s) with images (e.g., with images used to generate the difference image(s)). For example, the concatenator 804 may concatenate images by appending one or more channels of each image to the one or more channels of another image. For example, the concatenator 804 may concatenate difference images and images by appending one or more channels of each difference image to the one or more channels of an image used to generate the difference image.

Figure 9:
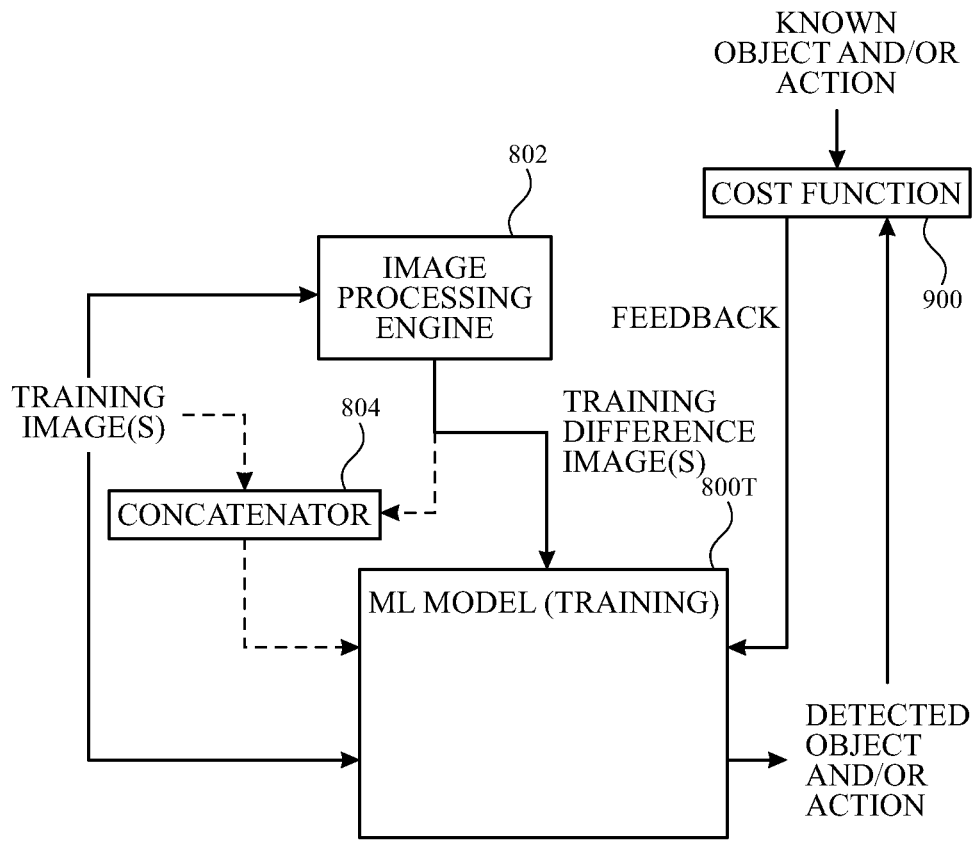
FIG. 9 illustrates a schematic diagram of an example process for training a machine-learning model using pixel differences in accordance with aspects of the subject technology.

FIG. 9 illustrates a training operation for training the ML model for object and/or action detection and/or recognition in accordance with one or more implementations. As shown in FIG. 9, an ML model 800T undergoing training may be provided with (e.g., processed or unprocessed) training images and/or training difference images generated by image processing engine 802 based on the training images. As shown, concatenator 804 may concatenate one or more training images and/or one or more training difference images using the operations described above in connection with FIG. 8.

As shown in the example of FIG. 9, during training, the ML model 800T may output a detected object and/or action, and the output may be compared (e.g., using a cost function 900 or other comparison mechanism) with a known object and/or action (e.g., in the form of an expected label) that is known to be depicted in one or more of the images provided to the ML model 800. As shown, based on the comparison, feedback based on the comparison may be provided to the ML model 800T for adjustment of weights and/or other parameters of the model as described herein.

Figure 10:
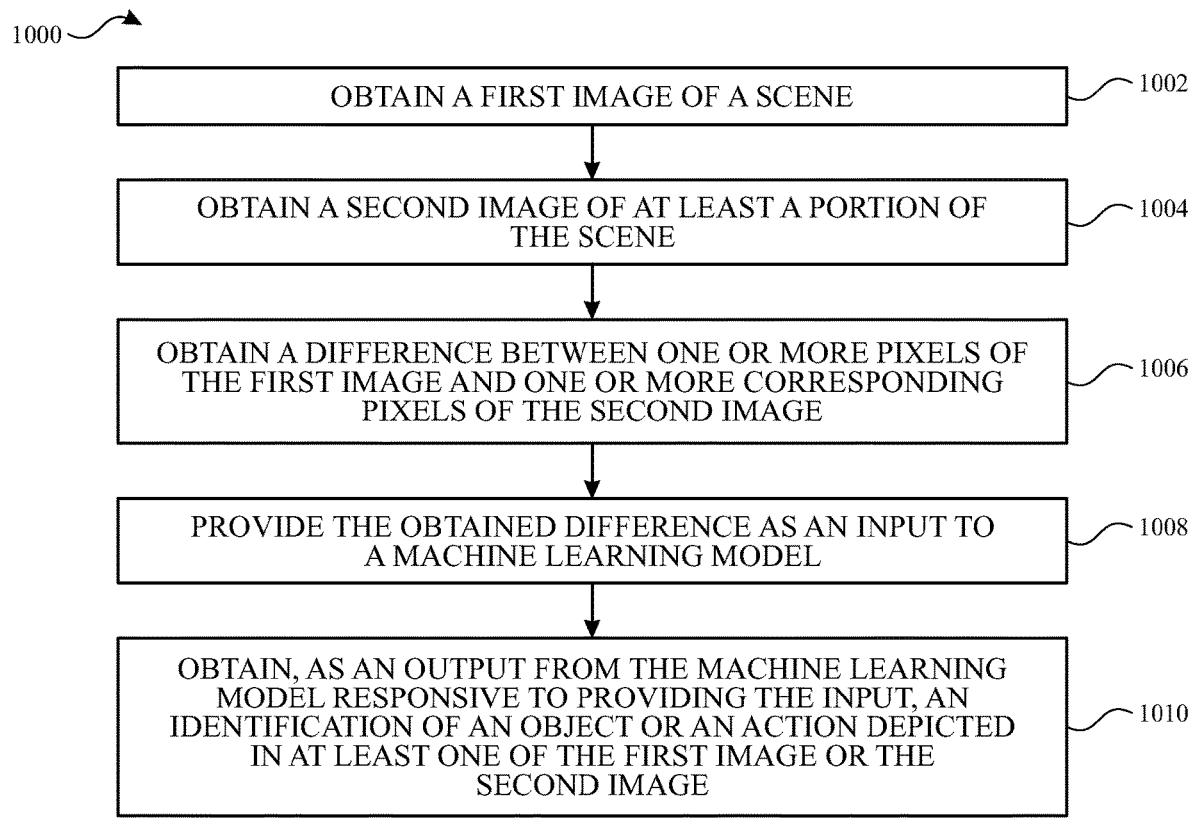
FIG. 10 illustrates a flow chart of an example process for object detection based on pixel differences in accordance with aspects of the subject technology.

As illustrated in FIG. 9, in one or more implementations, a training difference image may be provided as a training input to the machine-learning model, the training difference image generated from a subtraction of a first training image captured at a first time and a second training image captured at a second time, at least one of the first training image or the second training image including an image of a known training object. The machine-learning model may be operated to generate, as a training output of the machine-learning model using a set of weights of the machine-learning model and responsive to providing training difference image, a training output. The training output from the machine-learning model may be compared with a label corresponding to the known training object, and one or more weights of the machine-learning model may be adjusted based on the comparison FIG. 10 illustrates a flow diagram of an example process 1000 for object and/or action detection using pixel differences in accordance with one or more implementations. For explanatory purposes, the process 1000 is primarily described herein with reference to the trained ML model 800 and/or the computer system 1200 of FIG. 12. However, the process 1000 is not limited to the trained ML model 800 and/or the computer system 1200 of FIG. 12, and one or more blocks (or operations) of the process 1000 may be performed by one or more other components and/or and other suitable devices. Further for explanatory purposes, the blocks of the process 1000 are described herein as occurring in serial, or linearly. However, multiple blocks of the process 1000 may occur in parallel. In addition, the blocks of the process 1000 need not be performed in the order shown and/or one or more blocks of the process 1000 need not be performed and/or can be replaced by other operations.

At block 1002, a first image of a scene may be obtained. Obtaining the first image may include capturing the first image (e.g., at a first time) using a camera, or may include obtaining a first image that was previously captured and/or stored.

In one or more implementations, obtaining the first image may include obtaining the first image with a camera implemented as a static or stationary camera that is fixed in position to capture images of a fixed scene (e.g., so that pixels at the same pixel location in images captured at different times correspond to the same location in the scene). In other implementations, a camera may be a moveable or mobile camera with position and/or orientation tracking so that overlapping portions of partially overlapping images captured at different times can be subtracted by determining which pixel in a second image corresponds to which pixel in the first image using the with position and/or orientation tracking.

At block 1004, a second image of at least a portion of the scene may be obtained. The second image may include image information captured at a second time that is different from the first time. In one or more implementations, obtaining the first image may include capturing the first image at a first time, and obtaining the second image may include capturing the second image at the second time, the second time being prior to the first time. In one or more implementations, obtaining the first image may include capturing the first image at a first time, and obtaining the second image may include generating the second image by combining multiple additional images each captured at a corresponding time prior to the first time (e.g., by computing an average or a median of the multiple additional images).

In one or more implementations, obtaining the first image may include capturing the first image at a first time, and obtaining the second image may include selecting the second image from multiple candidate pool images each captured at a corresponding time prior to the first time. Selecting the second image from the multiple candidate pool images may include selecting the second image randomly from the multiple candidate pool images, or based on a pre-determined selection criteria for a particular type of object to be detected. In one or more implementations, the second image may be obtained by processing a plurality of images captured by a camera prior to the first image. Processing the plurality of image frames may include computing an average of the image frames, computing a median of the image frames, filtering (e.g., low pass filtering) the image frames, and/or selecting one or more image frames from the a candidate pool of image frames.

At block 1006, a difference between one or more pixels of the first image and one or more corresponding pixels of the second image may be obtained. For example, the obtained difference may include a difference image that includes a difference between each of the pixels of the first image and each corresponding pixel of the second image. In one or more implementations, the obtained difference may be smoothed or otherwise processed to reduce noise in the difference (e.g., by applying a low pass filter to the obtained difference). In one or more implementations, the obtained difference (e.g., a difference image) may be concatenated with the first image and/or the second image.

In one or more implementations, obtaining the first image may include capturing the first image using a stationary camera, obtaining the second image may include capturing the second image with the stationary camera, and each of the pixels of the first image and each of the corresponding pixels of the second image are capturing using the same physical pixel of the stationary camera.

In other implementations, prior to obtaining the difference between the one or more pixels of the first image and the one or more corresponding pixels of the second image, the first image and the second image may be aligned to identify the one or more corresponding pixels of the second image that correspond to the one or more pixels of the first image. For example, if the second image is offset and/or rotated with respect to the first image, the content of the first image and the second image (e.g., features, objects, and/or edges that are present in both the first image and the second image) and/or known (e.g., tracked) motion of the camera can be used to spatially align the first and second images identify pixels in the second image that spatially correspond to pixels in the first image.

In one or more implementations, the first image and the second image are each multi-channel images (e.g., images that each include multiple color channels such as RGB images). Obtaining the difference may include obtaining a difference image for each channel of the multi-channel images (e.g., obtaining a red difference image, a green difference image, and a blue difference image). In one or more implementations, concatenating the obtained difference and the first image may include adding the difference image for each channel (e.g., the red difference image, the green difference image, and the blue difference image) as additional channels of the first image. In one or more implementations, pre-processing operations may be performed on the first image and/or the second image prior to obtaining the difference. Pre-processing operations may include mean and/or variance normalization of the first image and/or the second image.

In various implementations, obtaining the difference between the one or more pixels of the first image and the one or more corresponding pixels of the second image may include obtaining a raw difference or an absolute value of the raw difference between the one or more pixels of the first image and the one or more corresponding pixels of the second image.

At block 1008, the obtained difference may be provided as an input to a machine-learning model. In one or more implementations, the first image and/or the second image may also be provided as an additional input to the machine-learning model. For example, providing the obtained difference and the first image and/or the second image to the machine-learning model may include concatenating the obtained difference and the first image, and providing a result of the concatenating as a single input to the machine-learning model. In one or more implementations, a filter (e.g., a low pass filter such as a Gaussian filter that reduces noise) may be applied to the obtained difference prior to providing the obtained difference as the input to the machine-learning model.

At block 1010, as an output from the machine-learning model may be obtained responsive to providing the input, an identification of an object or an action depicted in at least one of the first image or the second image. The output may include a label for an object and/or an action identified using the input.

In various examples that are described herein, object and/or action detection is performed by a machine-learning model based on pixel difference input to the machine-learning model. However, for various objects and/or actions, the importance of the pixel difference for the detection may vary. In one or more implementations, it may be advantageous to allow the machine-learning engine to learn whether or not (and/or how much) the difference between images separated in time is relevant to the object detection. For example, in one or more implementations, rather than providing pixel differences to the machine-learning model for training, sets of at least two images of an at least partially overlapping scene that have been captured at two different times may be provided to the machine-learning model during training. At inference (e.g., execution) time, the machine-learning model can be provided with at least two images separated in time, with or without providing a pixel difference information to the model.

Figure 11:
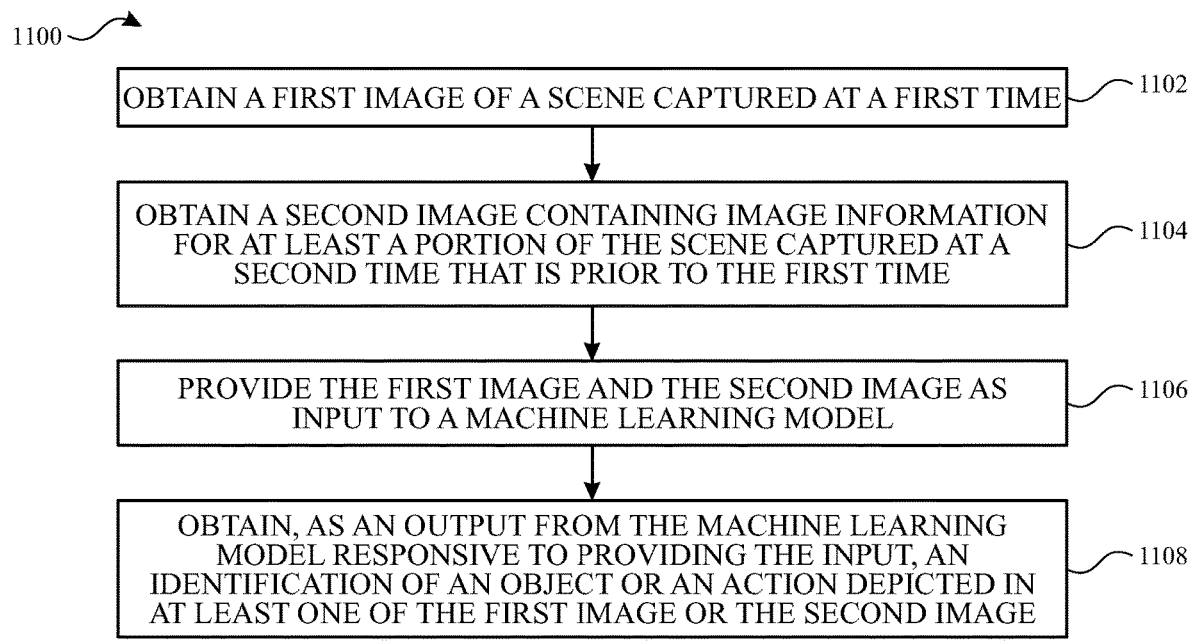
FIG. 11 illustrates a flow chart of another example process for object and/or action detection in accordance with aspects of the subject technology.

FIG. 11 illustrates a flow diagram of an example process 1100 for object detection using two or more images separated in time in accordance with one or more implementations. For explanatory purposes, the process 1100 is primarily described herein with reference to the trained ML model 800 and the computer system 1200 of FIG. 12. However, the process 1100 is not limited to the trained ML model 800 and computer system 1200 of FIG. 12, and one or more blocks (or operations) of the process 1100 may be performed by one or more other components and/or and other suitable devices. Further for explanatory purposes, the blocks of the process 1100 are described herein as occurring in serial, or linearly. However, multiple blocks of the process 1100 may occur in parallel. In addition, the blocks of the process 1100 need not be performed in the order shown and/or one or more blocks of the process 1100 need not be performed and/or can be replaced by other operations.

At block 1102, a first image of a scene captured at a first time may be obtained. Obtaining the first image may include capturing the first image using a camera (e.g., a fixed camera) or obtaining an image that has been previously captured and/or stored.

At block 1104, a second image containing image information for at least a portion of the scene captured at a second time that is prior to the first time may be obtained. In one or more implementations, the second image includes a combination (e.g., an average or a median) of multiple images captured prior to the first time. In one or more implementations, the first image and/or the second image may be pre-processed (e.g., by performing mean and/or variance normalization). In one or more implementations, the second image may be obtained by processing a plurality of images captured by a camera prior to the first image. Processing the plurality of image frames may include computing an average of the image frames, computing a median of the image frames, filtering (e.g., low pass filtering) the image frames, and/or selecting one or more image frames from the a candidate pool of image frames.

At block 1106, the first image and the second image may be provided as input to a machine-learning model. In one or more implementations, providing the first image and the second image as input to a machine-learning mode may include concatenating the second image and the first image to form a single multi-channel image input to the machine-learning model. Concatenating the first and second images may include concatenating first and second multi-channel (e.g., RGB) images. In one or more implementations, the machine-learning model may have been trained to recognize objects or the actions based, at least in part, on a change in position of an object between the first image and the second image.

At block 1108, as an output from the machine-learning model responsive to providing the input, an identification of an object or an action depicted in at least one of the first image or the second image may be obtained.

As described above, one aspect of the present technology is the gathering and use of data available from specific and legitimate sources for training and/or operating machine-learning models. The present disclosure contemplates that in some instances, this gathered data may include personal information data that uniquely identifies or can be used to identify a specific person. Such personal information data can include images, audio data, demographic data, location-based data, online identifiers, telephone numbers, email addresses, home addresses, biometric data or records relating to a user's health or level of fitness (e.g., vital signs measurements, medication information, exercise information), or any other personal information.

The present disclosure recognizes that the use of such personal information data, in the present technology, can be used to the benefit of users. For example, the personal information data can be used for training a machine-learning model and/or executing a machine-learning model for image based object and/or action recognition.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of image based object and/or action detection and/or recognition, the present technology can be configured to allow users to select to "opt in" or "opt out" of participation in the collection and/or sharing of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level or at a scale that is insufficient for facial recognition), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 12:
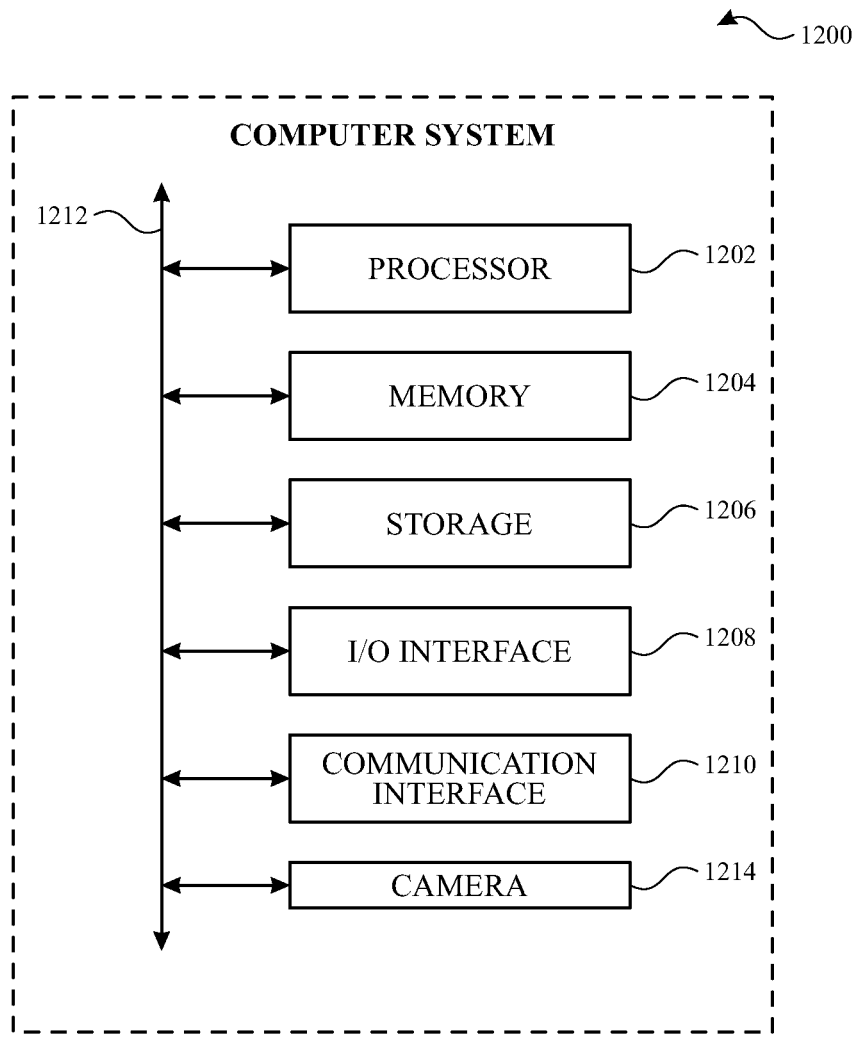
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate. In particular embodiments, computer system 1200 includes a processor 1202, memory 1204, storage 1206, an input/output (I/O) interface 1208, a communication interface 1210, a bus 1212, and (optionally) a camera 1214. Although this disclosure describes and illustrates a particular computer system having a particular number of particular components in a particular arrangement, this disclosure contemplates any suitable computer system having any suitable number of any suitable components in any suitable arrangement. In one or more implementations, camera 1214 may be implemented separately from the computer system 1200 (e.g., an configured to communication with the computer system 1200 via communication interface 1210). Camera 1214 may be a fixed camera or a movable camera (e.g., with position and/or orientation tracking capabilities).

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In accordance with aspects of the disclosure, a method is provided that includes obtaining a first image of a scene; obtaining a second image of at least a portion of the scene; obtaining a difference between one or more pixels of the first image and one or more corresponding pixels of the second image; providing the obtained difference as an input to a machine-learning model; and obtaining, as an output from the machine-learning model responsive to providing the input, an identification of an object or an action depicted in at least one of the first image or the second image.

In accordance with other aspects of the disclosure, a method is provided that includes obtaining a first image of a scene captured at a first time; obtaining a second image containing image information for at least a portion of the scene captured at a second time that is prior to the first time; providing the first image and the second image as input to a machine-learning model; and obtaining, as an output from the machine-learning model responsive to providing the input, an identification of an object or an action depicted in at least one of the first image or the second image.

In accordance with other aspects of the disclosure, a system is provided that includes a camera configured to capture a first image of a scene; and one or more processors, configured to: obtain the first image of the scene; obtain a second image of at least a portion of the scene; obtain a difference between one or more pixels of the first image and one or more corresponding pixels of the second image; provide the obtained difference as an input to a machine-learning model; and obtain, as an output from the machine-learning model responsive to providing the input, an identification of an object or an action depicted in at least one of the first image or the second image.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

What is claimed is:

1. A method, comprising:
   obtaining a first image of a scene at a first time;
   obtaining a second image of at least a portion of the scene, the second image including image information captured at a second time that is different from the first time, wherein obtaining the second image comprises selecting the second image from a candidate pool of images each captured at a corresponding time prior to the first time;
   obtaining a difference between one or more pixels of the first image and one or more corresponding pixels of the second image;
   providing the obtained difference as an input to a machine-learning model; and
   obtaining, as an output from the machine-learning model responsive to providing the input, an identification of an object or an action depicted in at least one of the first image or the second image.

2. The method of claim 1, further comprising providing at least one of the first image or the second image as an additional input to the machine-learning model.

3. The method of claim 2, wherein providing the obtained difference and the at least one of the first image or the second image comprises concatenating the obtained difference and the first image, and providing a result of the concatenating as a single input to the machine-learning model.

4. The method of claim 3, wherein the obtained difference comprises a difference image that includes a difference between each of the pixels of the first image and each corresponding pixel of the second image.

5. The method of claim 4, wherein the first image and the second image are each multi-channel images, wherein obtaining the difference comprises obtaining a difference image for each channel of the multi-channel images.

6. The method of claim 5, wherein concatenating the obtained difference and the first image comprises adding the difference image for each channel as an additional channel of the first image.

7. The method of claim 1, further comprising performing image pre-processing operations on the first image and the second image prior to obtaining the difference.

8. The method of claim 1, wherein obtaining the difference between the one or more pixels of the first image and the one or more corresponding pixels of the second image comprises obtaining a raw difference or an absolute value of the raw difference between the one or more pixels of the first image and the one or more corresponding pixels of the second image.

9. The method of claim 8, further comprising applying a filter to the obtained difference prior to providing the obtained difference as the input to the machine-learning model.

10. The method of claim 1, wherein obtaining the second image comprises capturing the second image at the second time that is different from the first time, and wherein the second time is prior to the first time.

11. The method of claim 1, wherein obtaining the second image comprises generating the second image by combining a plurality of additional images each captured at a corresponding time prior to the first time.

12. The method of claim 1, wherein obtaining the first image comprises capturing the first image using a stationary camera, wherein obtaining the second image comprises capturing the second image with the stationary camera, and wherein each of the pixels of the first image and each of the corresponding pixels of the second image are capturing using the same physical pixel of the stationary camera.

13. The method of claim 1, further comprising, prior to obtaining the difference between the one or more pixels of the first image and the one or more corresponding pixels of the second image, aligning the first image and the second image to identify the one or more corresponding pixels of the second image that correspond to the one or more pixels of the first image.

14. The method of claim 1, further comprising training the machine-learning model by:
providing a training difference image as a training input to the machine-learning model, the training difference image generated from a subtraction of a first training image captured at a first time and a second training image captured at a second time, at least one of the first training image or the second training image including an image of a known training object;
generating, as a training output of the machine-learning model using a set of weights of the machine-learning model and responsive to providing training difference image, a training output;
comparing the training output from the machine-learning model with a label corresponding to the known training object; and
adjusting one or more weights of the machine-learning model based on the comparing.

15. The method of claim 1, wherein the identification of the object or the action comprises a classification of the object or the action.

16. A method, comprising:
obtaining a first image of a scene captured at a first time;
obtaining a second image containing image information for at least a portion of the scene captured at a second time that is prior to the first time;
providing the first image and the second image as input to a machine-learning model, wherein providing the first image and the second image as input to a machine-learning model comprises concatenating the second image and the first image to form a single multi-channel image input to the machine-learning model; and
obtaining, as an output from the machine-learning model responsive to providing the input, an identification of an object or an action depicted in at least one of the first image or the second image.

17. The method of claim 16, wherein the second image comprises a combination of multiple images captured prior to the first time.

18. The method of claim 16, wherein the machine-learning model has been trained to recognize the object or the action based, at least in part, on a change in position of the object between the first image and the second image.

19. A system, comprising:
a camera configured to capture a first image of a scene; and
one or more processors, configured to:
obtain the first image of the scene;
obtain a second image of at least a portion of the scene;
obtain a difference between one or more pixels of the first image and one or more corresponding pixels of the second image;
provide a result of concatenating the obtained difference and the first image as a single input to a machine-learning model and provide at least one of the first image or the second image as an additional input to the machine-learning model; and
obtain, as an output from the machine-learning model responsive to providing the input, an identification of an object or an action depicted in at least one of the first image or the second image.

20. The system of claim 19, wherein the one or more processors are configured to obtain the second image by processing a plurality of images captured by the camera prior to the first image.

21. The system of claim 19, wherein the camera is a stationary camera that is fixed in position to capture images of a fixed scene.

22. The system of claim 21, wherein the one or more processors are configured to apply a filter to the obtained difference prior to providing the obtained difference to the machine-learning model.

* * * * *

UNITED STATES PATENT AND TRADEMARK OFFICE
CERTIFICATE OF CORRECTION

| | | |
|---|---|---|
| PATENT NO. | : 12,165,337 B2 | Page 1 of 1 |
| APPLICATION NO. | : 17/068750 | |
| DATED | : December 10, 2024 | |
| INVENTOR(S) | : Anish Prabhu et al. | |

It is certified that error appears in the above-identified patent and that said Letters Patent is hereby corrected as shown below:

On the Title Page

Item (56) Under OTHER PUBLICATIONS:
Replace "Baghcrinczhad, ct al., "Arc Elephants Bigger than Butterflies?" with --Bagherinezhad, et al., "Are Elephants Bigger than Butterflies?--.

Signed and Sealed this
Twenty-fifth Day of February, 2025

Coke Morgan Stewart
*Acting Director of the United States Patent and Trademark Office*